United States Patent [19]

Demarthe et al.

[11] 4,016,056
[45] Apr. 5, 1977

[54] METHOD OF OBTAINING COPPER FROM SULPHURIZED CONCENTRATES

[75] Inventors: Jean-Michel Demarthe, Viroflay; André Georgeaux, Rambouillet; Alain Sonntag, Maurepas, all of France

[73] Assignee: Societe Miniere et Metallurgique de Penarroya, Paris, France

[22] Filed: May 15, 1975

[21] Appl. No.: 577,658

[30] Foreign Application Priority Data

May 15, 1974 France ........................... 74.16772

[52] U.S. Cl. ................................ 204/108; 75/101 R; 75/101 Be; 75/114; 75/117; 75/121
[51] Int. Cl.² ........................................... C25C 1/12
[58] Field of Search ......... 204/108, 107; 75/101 R, 75/101 BE, 117, 121, 114

[56] References Cited

UNITED STATES PATENTS

| | | | |
|---|---|---|---|
| 3,752,745 | 8/1973 | Kane et al. | 204/107 |
| 3,776,826 | 12/1973 | Atadan | 204/107 |
| 3,896,208 | 7/1975 | Dubeck et al. | 75/101 R |
| 3,901,776 | 8/1975 | Kruesi et al. | 75/101 R |

Primary Examiner—R. L. Andrews
Attorney, Agent, or Firm—Fleit & Jacobson

[57] ABSTRACT

A method for obtaining electrolytic copper and other useful metals from sulphurized concentrates, including in combination, the following stages:

a. lixiviating the sulphurized concentrate with an aqueous solution containing cupric chloride formed in situ, at least in part, by oxidation, by introducing hydrochloric acid and air into the cuprous chloride solution resulting from lixiviation;

b. partially extracting the copper contained in the lixiviation solution resulting from stage a) by contacting the lixiviation solution with an organic extractant containing a cationic solution, the extraction being accompanied by oxidation by injecting air into the lixiviation solution;

c. re-extracting the copper contained in the organic extractant by contacting the organic extractant with an aqueous solution of sulphuric acid and recycling the organic extractant to the extraction stage b); and d. electolyzing the copper sulphate solution obtained in stage c) to yield copper and an aqueous solution of sulphuric acid which is recycled to the re-extraction stage c), at least part of the aqueous solution, which results from the partial copper extraction stage b), being recycled to the lixiviation stage a) and constituting a part of the cupric chloride solution, the other part of the aqueous solution being treated to recover the useful metals and the hydrochloric acid that it contains.

16 Claims, 1 Drawing Figure

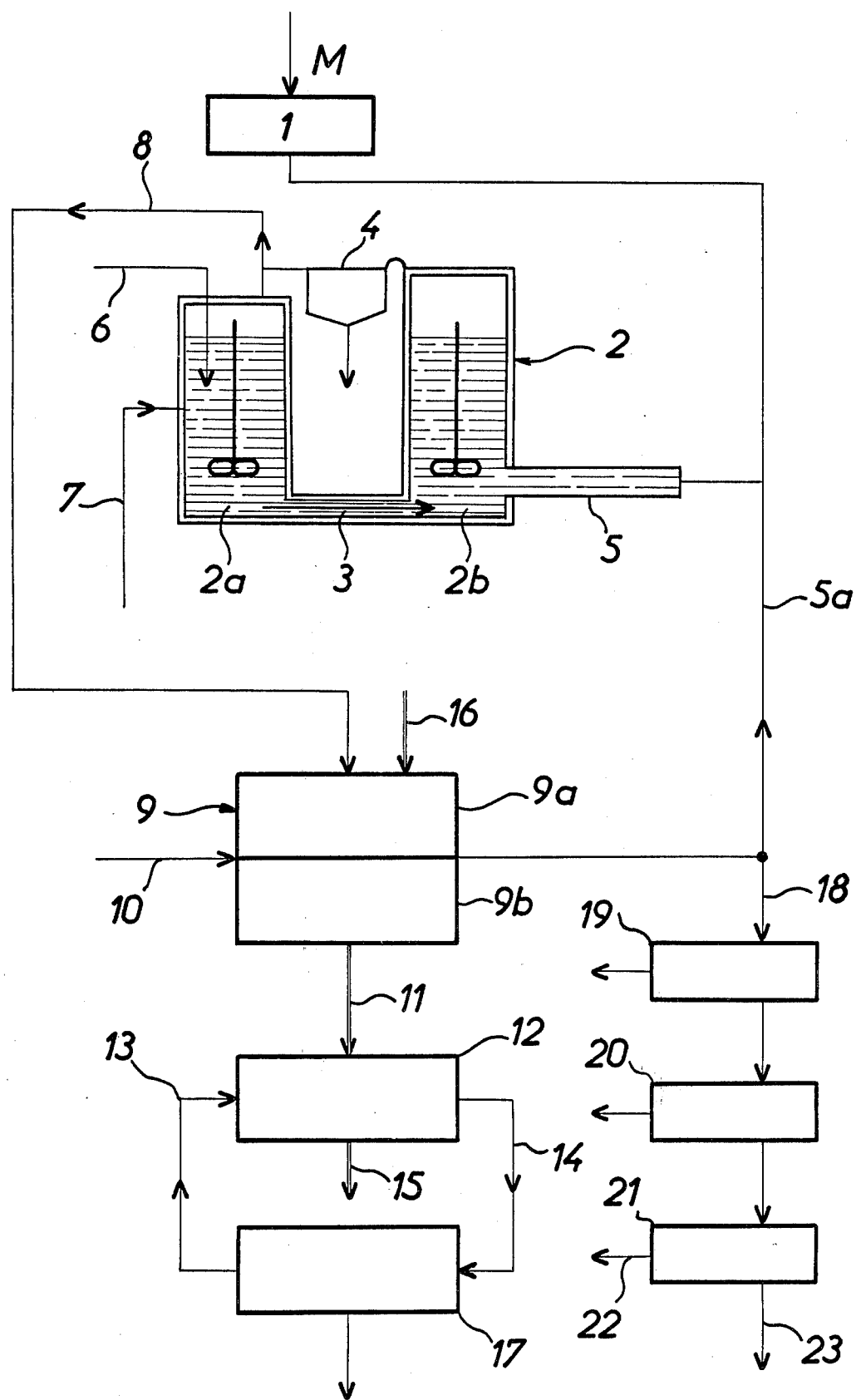

METHOD OF OBTAINING COPPER FROM SULPHURIZED CONCENTRATES

The present invention concerns a hydrometallurgical method for the treatment of sulphurized copper concentrates, which treatment is particularly applicable to copper ores such as bornite, chalcopyrite and chalcocite. It is well-known that these copper-bearing ores are always accompanied by gangue or other types of ore such as pyrites, quartz and calcite, the major portion of this gangue being eliminated during the preliminary stage in the concentration of the ore. A concentrate is thus obtained which contains for example approximately 15 to 50% of copper and 5 to 35% of iron.

Hydrometallurgical processes enabling such concentrates to be treated are known, but these known processes suffer from a certain number of drawbacks, among which may be quoted excessive consumption of reagents and insufficient purity of the copper obtained.

Also, one of the objects of the present invention is to provide a method of the kind specified above which enables electrolytic copper to be obtained by the minimal use of outside reagents.

A further object of the invention is to provide a method which, because of its flexibility, enables operating costs to be reduced to a minimum. According to the invention, these objects and others which will appear hereinafter are achieved by means of a method which comprises, in succession, the following stages:

a. lixiviation of said sulphurized concentrate by an aqueous solution containing cupric chloride formed in situ, at least in part, by oxidation, by means of hydrochloric acid and air, of the cuprous chloride solution resulting from lixiviation;

b. partial extraction of the copper contained in the lixiviation solution resulting from the preceding stage, by contacting said lixiviation solution with an organic phase containing a cationic solution, said extraction being accompanied by oxidation by injection of air;

c. re-extraction of the copper contained in said organic phase by contacting the latter with an aqueous solution of sulphuric acid and recycling the organic phase to the extraction stage b); and d. electrolysis of the copper sulphate solution obtained in the preceding stage, with a yield on the one hand of copper and on the other of an aqueous solution of sulphuric acid which is recycled to the re-extraction stage (c), part at least of the aqueous phase which results from the partial copper extraction stage (b), being recycled to the lixiviation stage (a) and constituting a part of said cupric chloride solution.

Preferably, the part of the aqueous phase resulting from the extraction stage (b) that is not recycled to the lixiviation stage (a) is treated in the customary manner to recover, at least partially, the metals that it contains, with the exception of iron, and it is then subjected to pyrohydrolysis to produce iron oxide and hydrochloric acid, the latter being recycled to the lixiviation stage (a).

Specialists in this field will readily appreciate that the method forming the subject-matter of the present invention enables metallic copper to be obtained by electrolysis in a sulphate medium, permits the iron contained in the original sulphurized concentrate to be eliminated in the form of oxide, and also allows of the elimination, in elementary form, of the sulphur associated with this concentrate, thus avoiding oxidation of the sulphur into sulphurous anhydride or sulphate.

Regarding the aqueous lixiviation solution specified above, its oxido-reduction potential is preferably between 500 and 800 millivolts; its temperature is higher than 50° C and is advantageously between 90° and 105° C, and its pH value, which is at most 1, is preferably between 0 and 1. This solution advantageously contains approximately 10 to 50 g of copper per liter, and it may also contain at least 50 g of iron ions per liter.

As regards the partial copper extraction stage (b), this can be carried out by means of a single step using mixture and decanting apparatus, because of the nature of the method of the invention. If this stage comprises a single mixing and decanting apparatus, the injection of air that takes place at the extraction stage can be carried out in the mixing compartment of this apparatus. If extraction is carried out by means of a pair of mixing and decanting apparatuses, this injection of air may take place in a separate oxidation reaction vessel through which the aqueous phase passes, this phase flowing from one mixing and decanting apparatus to the other.

The partial copper extraction stage (b) is advantageously carried out at a temperature between 30° and 60° C and with a pH-value of between 0 and 1 approximately, the ratio of the volume of the organic phase to that of the aqueous phase being between 0.5 and 5 approximately.

Finally, at the final electrolysis stage which enables pure copper to be obtained, the electrolyzed solution preferably contains between 20 and 100 g of copper per liter.

Advantageously, the lixiviation solution also contains a cuprous chloride solubilizing agent which may be an alkaline chloride or and alkaline-earth chloride, ammonium chloride or ferrous chloride. For reasons of economy, it is preferred to use sodium chloride in quantities of between 100 and 300 g/l.

The following description, to which the invention is in no way limited, will explain how the present invention may be practised. The description will refer to the annexed DRAWING which illustrates in a very diagrammatic manner the various stages in the method of the invention.

To make the description clearer, it will be divided into four parts corresponding to the four main stages in the treatment in question, namely: lixiviation of the initial sulphurized concentrate, purification with change of anion, electrolysis of the copper sulphate obtained and, finally, the production of hydrochloric acid with elimination of impurities.

I. Lixiviation

The initial ore M is first subjected to a conventional concentrating and crushing operation at 1 and is then introduced into a lixiviation reaction vessel designated generally by the reference numeral 2 in the drawing. As will be seen from the drawing this reaction vessel consists of two compartments $2a$ and $2b$ equipped with stirring means and interconnected at their lower parts by a passage 3 in which a screw impeller, not shown, which has a horizontal shaft and the speed of which can be adjusted, enables the rate of flow of the liquid from the compartment $2a$ to the compartment $2b$ to be regulated. At its upper part the compartment $2b$ has an overflow whereby it communicates with a decanter 4.

On the other hand, a pipe 5 for introducing fresh concentrate runs into the compartment 2b near its base, and this pipe is connected to a pipe 5a which conveys the cupric chloride obtained from the second stage of the process, as will be explained hereinafter.

The compartment 2a has an air-injection pipe 6 and a pipe 7 for introducing hydrochloric acid obtained in the fourth stage of the method as will be detailed hereinafter. Finally, this compartment 2a is also equipped with a device 8 which is connected to the upper part of the decanter 4 and which enables the solution to be extracted after lixiviation, which solution is passed to the next stage of the process.

It will be appreciated that the fresh concentrate introduced through the pipe 5 into the compartment 2b of the reaction vessel is contained as a pulp in the cupric chloride solution passing from the pipe 5a. In the compartment 2b, this solution, which is stirred and is at a temperature greater than the ambient temperature, dissolves the copper and iron in the concentrate. The cupric chloride is then partially reduced to the cuprous chloride condition by the following simplified reaction which applies in the case where the ore being treated is chalcopyrite:

$$3\ CuCl_2 + (CuFe)S_2 \rightleftharpoons 4\ CuCl + FeCl_2 + 2\ S° \qquad (1)$$

By simply overflowing at the top of the compartment 2b, the reduced solution, the unaffected residue and the elementary sulphur pass into the decanter 4 where the residue separates from the partially reduced solution. The residue is eliminated at the base of the decanter 4, and the overflowing solution passes through the pipe 8 into the compartment 2a of the reaction vessel 2. In this compartment this solution is contacted with air introduced through the pipe 6 and with recycled hydrochloric acid passing from the pipe 7. The resulting reaction is as follows:

$$4\ CuCl + 4\ HCl + O_2 \rightleftharpoons 4\ CuCl_2 + 2\ H_2O \qquad (2)$$

This reaction is the basic reaction of the method of the invention. To be complete in the "left-to-right" direction, that is to say in the direction of oxidation of the cuprous chloride, it does not call for the use of high pressure, so that it suffices to inject air at atmospheric pressure into the reaction vessel. Nor does the reaction require that the pH-value of the solution be controlled in the compartment 2a, and this simplifies the carrying out of the method. The solution re-oxidized in this way then passes once more through the passage 3 formed in the lower part of the reaction vessel 2 and into the compartment 2b where it is used for reacting with further quantities of sulphurized concentrate.

As regards the operational data, it should be stated that the rate at which air is passed through the injection pipe 6 and the rate at which the solution passes through the lower passage 3 should be adjusted in such a way that the pH-value and the oxido-reduction potential of the solution in the compartment 2b remain substantially constant. More particularly, it is advantageous to select, for this potential, a value of between 500 and 800 mV, by reference to the hydrogen electrode, the lower potential of 500 mV corresponding to a cuprous chloride solution containing little cupric chloride, whereas the maximum potential of 800 mV will be used in the case of a solution of pure cupric chloride.

The precise choice of the oxido-reduction potential will in fact depend upon the nature of the ore being treated and upon the objectives envisaged. Thus, when working with a potential of approximately 500 mV, that is to say with a high proportion of cupric ions, it is possible to achieve very great selectivity as regards dissolution of copper in chalcopyrite — iron pyrites and sulphur not passing into solution, — but this reduces the rate of solution of the copper and also the total yield in the dissolution of this metal. Conversely, if it is required to obtain a very good yield in the dissolution of copper at the expense of the selectivity of the reaction, an oxido-reduction potential of approximately 700 mV may be maintained in the compartment 2b of the reaction vessel by increasing the rate at which air is injected and the rate at which the solution passes through the passage 3.

As regards regulating the pH-value, this is achieved in practice by varying the rate at which air is injected into the reaction vessel through the pipe 6, once the rate at which hydrochloric acid, entering the reaction vessel through the pipe 7, has been fixed. Then, if the pH-value drops, the rate at which air is delivered is increased, and if, on the other hand, the pH-value increases, it will be necessary to reduce the rate of delivery of air to avoid any possible risk of hydrolysis of the iron.

It is quite obvious that it is also possible to resolve the problem by varying the rate at which hydrochloric acid is injected. To adjust the two important parameters, that is to say the pH-value and the oxido-reduction potential, the rate of delivery of air, the rate at which acid is delivered and/or the rate at which the liquid circulates can thus be varied.

The method of lixiviation that has just been described and which comprises reacting with hydrochloric acid and air in the presence of cuprous and cupric ions, enables the recycling of reagents to be limited, precisely because of the fact that the lixiviation agent is not cupric chloride, as in certain earlier methods, but hydrochloric acid in the presence of air. If cuprous chloride is not permanently re-oxidized in situ to form cupric chloride with the help of the mixture of hydrochloric acid and air, the lixiviation solution should in fact contain a sufficient quantity of oxidizing agent, that is to say of cupric chloride or ferric chloride to equilibrate, respectively, the following reactions:

$$3\ CuCl_2 + (CuFe)S_2 \rightarrow 4\ CuCl + FeCl_2 + 2\ S° \qquad (4)$$

$$4\ FeCl_3 + (CuFe)S_2 \rightarrow 5\ FeCl_2 + CuCl_2 + S° \qquad (5)$$

By way of comparison, to dissolve a mole of chalcopyrite $(CuFe)S_2$, at least three moles of cupric chloride or four moles of ferric chloride are necessary, whereas in the method in accordance with the invention one mole of cupric chloride suffices, bearing in mind the various recyclings, that is three times less and four times less respectively than in the known processes.

On the other hand the copper concentration in the lixiviation solution should be at least 5 g/l in order to obtain good reaction kinetics. In practice it is preferred to use a solution having a copper concentration of between 10 and 60 g/l.

As regards the pH-value of the solution, there is no bottom limit to this since oxidation of the cuprous copper to form cupric copper takes place when the medium is very acid. On the other hand, the pH-value has an upper limit of 1, and if this value is exceeded then, as will be explained hereinafter, there will follow oxidation of ferrous iron into ferric iron and precipitation of iron hydroxide which should be avoided. Advantageously, a pH-value of between 0 and 1 will be selected.

Regarding the temperature of the reaction, numerous tests have shown that this should be above 50° C and that it may advantageously lie between 90° and 105° C.

Since cuprous chloride is only slightly soluble in water, it is advantageous to add to the solution a chloride which increases its solubility. According to the invention use can be made of ferrous chloride for this purpose, and this also offers an important advantage when the ore to be treated is chalcopyrite since iron is present therein. The concentration of iron in the solution is advantageously greater than 50 g/l and is preferably in the order of 100 g/l.

On the other hand specialists in this field will readily appreciate that it is possible to carry out the lixiviation that has been described in a number of stages.

Finally, the solution obtained after the reaction contains residual cupric chloride which, if required, could be reduced by fresh ore, using the counterflow technique.

EXAMPLE 1

The following Example relates to lixiviation by cupric chloride of a chalcopyrite from the French deposits in Burg (Tarn), this operation being carried out in the presence of ferric chloride and corresponding substantially to the conditions occurring in the compartment 2b of the reaction vessel 2.

Two successive extractions were carried out, and the details of the products used are given in Table I below.

TABLE I

|  | Weight (g) or Volume (ml) | Concentration % or g/l | | | |
| --- | --- | --- | --- | --- | --- |
|  |  | Cu | Fe | Cl⁻ | S |
| Initial chalcopyrite | 70 | 29.4 | 21.6 |  | 23.7 |
| Initial solution of first reaction | 1 000 | 56.3 | 174 | 270 |  |
| Initial solution of second reaction | 1 000 | 56.3 | 174 | 270 |  |

The solution of the first reaction was first brought to a temperature of 107° C in a cylindrical reaction vessel which was agitated and was topped by an upwardly extending cooling means. The 70 g of chalcopyrite were then poured into this solution and the reaction was allowed to continue for two hours, after which the mixture was filtered. The solution obtained was retained for analysis, and the solid residue was subjected to a second reaction during a period of three hours.

Upon completion of this operation, the solution was filtered, the residue was washed and the two lixiviation solutions, the residue and the washing solution were analysed. The results obtained are shown in Table II below.

TABLE II

|  | Weight (g) or Volume (ml) | Concentration % or g/l | | | |
| --- | --- | --- | --- | --- | --- |
|  |  | Cu | Fe | S | Cl⁻ |
| Final solution of first reaction | 1 020 | 69.6 | 186 |  | 270 |
| Final solution of second reaction | 1 000 | 61.0 | 181 | 0.33 |  |
| Solution from washing the residue | 500 | 0.20 | 0.48 |  |  |
| Final residue | 24 | 2.34 | 3.06 | 55.1 |  |

The distribution, over the various final phases, of the copper and iron initially contained in the chalcopyrite is shown in Table III below.

TABLE III

|  | Solution of 1st reaction | Solution of 2nd reaction | Washing solution | Residue | Yield from reaction |
| --- | --- | --- | --- | --- | --- |
| Copper (%) | 73.3 | 23.4 | 0.5 | 2.79 | 97.2 |
| Iron (%) | 66.3 | 29.6 | 1.0 | 3.08 | 96.9 |

It will be seen that the yield of copper obtained by dissolution reached 97.2%. The lixiviation solution thus obtained was then subjected to the treatment which constitutes the second stage of the method, that is to say the purification and anion change stage.

EXAMPLE 2

This Example concerns the continuous attack of a chalcopyrite with cupric chloride, accompanied by regeneration of the latter by hydrochloric acid and air, the test carried out simulating the lixiviation stage. The solutions which were supplied for lixiviation of the ore were, on the one hand, the cupric chloride solution obtained during extraction by means of a solvent, and the other hand, the hydrochloric acid and the copper recovered in the flushing operation for eliminating iron.

The reactions used have been explained above. The equation which expresses the entire reaction is as follows:

$$\text{Cu Fe S}_2 + 3 \text{ HCl} + \tfrac{3}{4} \text{ O}_2 \rightarrow \text{CuCl} + \text{Fe Cl}_2 + 3/2 \text{ H}_2\text{O} + 2 \text{ S}° \quad (6)$$

It should however be noted that the cuprous chloride formed also comes from the cupric chloride used for the reaction resulting from the stage for carrying out reaction by means of a solvent. It is thus also possible to express the full lixiviation equation in the following form:

$$Cu^{++} + Cu\,Fe\,S_2 + 2\,H^+ + \tfrac{1}{2}\,O_2 \rightarrow 2\,Cu^+ + Fe^{++} + H_2O + 25° \quad (7)$$

This equation is fully representative of what happens. Whereas during extraction half the copper present is in fact extracted in the cuprous state, the other half is restored to the cupric state and is recycled into the reaction. Under these conditions two cuprous ions are required at the beginning for one cupric ion participating in the reaction.

In the test now to be described, a chalcopyrite containing 29.4% of copper and 21.6% of iron was continuously reacted with a solution containing 40 g/l of cupric copper and 100 g/l of ferrous iron. It was required to maintain excess cupric copper at the end of the reaction by starting with a solution containing approximately 40 g/l of $Cu^+$ and 20 g/l of $Cu^{++}$. These hypotheses led to the following overall theoretical balance of materials:

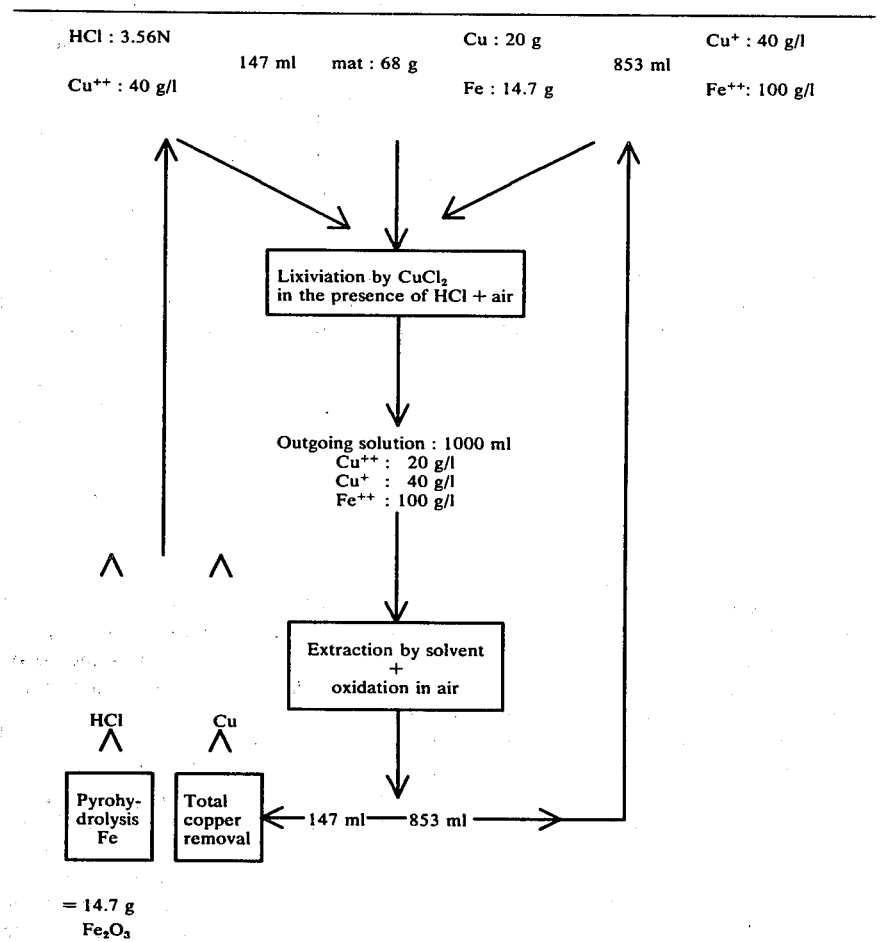

The equipment that was used comprised:
a lixiviation reaction vessel in which the chalcopyrite was reacted with cupric chloride,
a decanter through the base of which were extracted the residue from the reaction and the final reaction solution, whereas the overflow was passed to the oxidation reaction vessel,
an oxidation reaction vessel in which the oxidation reaction of the cuprous chloride was carried out by means of hydrochloric acid and air, and into which arrived the reaction solution ($HCl + CuCl_2$), and a part of the lixiviation solution which provided $Cu^+$ ions.

The layout of this equipment was therefore:

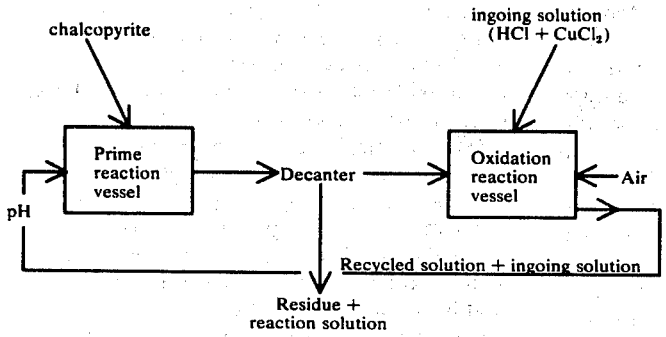

The relationship between the delivery rates of the feed liquid, the recycled solution and the ingoing solution was so calculated as to provide in theory a sufficient quantity of $Cu^+$ ions in the oxidation process to consume incoming HCl.

This resulted in the adoption of the following delivery rates:

| | |
|---|---|
| Ingoing solution (and outgoing reaction solution) | 0.5 l/h |
| Recycled solution and ingoing solution | 0.912 l/h |
| Ingoing chalcopyrite | 34 g/h |

To start up the installation, the prime reaction vessel, the decanter and the oxidation reaction vessel were filled with 3.5 liters of a neutral solution of $CuCl_2 \pm FeCl_2$, having the following composition:

Cu = 43.0 g/l
Fe = 109 g/l

Also, 102 g of ore were poured into the prime reaction vessel which contained 1.5 liters of initial neutral solution. Temperature was maintained at approximately 85° C.

At the end of an hour the pump delivering recycled solution to the prime reaction vessel was started up. At the same time chalcopyrite was introduced at a rate of 34 g/h, i.e. 8.5 g each quarter of an hour. The solution in the prime reaction vessel and containing the $Cu^+$ ions overflowed first into the decanter and then into the oxidation reaction vessel.

After 2 hours and 15 minutes had elapsed, the introduction was begun, at a rate of 0.5 l/h, of the acid feed solution having the following composition:

Cu = 41.6 g/l
Fe = 107 g/l
$H^+$ = 0.52 N

The pH-value was continuously measured at the outlet from the oxidation reaction vessel. This pH-measurement was used for checking the efficacy of the oxidation of the CuCl by hydrochloric acid and air; if the acid was not completely consumed, the pH-value dropped, and if oxidation was excessive the pH-value rose and this was followed by precipitation of hydroxide. The pH-value was fixed at 0.6 by manually adjusting the device controlling the delivery rate of the air.

After 5 hours had elapsed there was observed a drop in pH-value that could not be prevented by increasing the oxygen delivery rate.

Analysis carried out at this moment showed that there were no $Cu^+$ ions in the oxidation reaction vessel. This therefore indicated that the oxidation of $Cu^+$ ions entering the oxidation reaction vessel was complete.

The drop in the pH-value was therefore due to a deficit of $Cu^+$ ions in relation to the $H^+$ ions, this indicating that the reaction was not complete.

After 6 hours 15 minutes had elapsed the pH-value was less than or equal to zero, and operations were brought to a stop.

120 g of reaction residue containing 21.9% Cu and 16.9% of iron were continuously recovered. On completion of the reaction the prime reaction vessel contained 64 g of residue containing 20.8% Cu and 14.7% of iron.

The quantity of chalcopyrite introduced was 280.5 g and the dissolution yields were:

51.9% for Cu
50.9% for Fe

This test showed that it is possible to bring into solution the copper and iron contained in chalcopyrite by reacting the cupric chloride dissolved in a ferric chloride liquor, and to oxidize continuously part of the cuprous ions formed by means of hydrochloric acid and air, in order to recycle them to the lixiviation stage.

EXAMPLE 3

A third example concerns the oxidation of cuprous chloride by hydrochloric acid and air in the presence of ferrous chloride, this corresponding to what takes place in the compartment 2a of the reaction vessel 2. Its object was to show that the cuprous chloride solubilized by ferrous chloride and as obtained from the test described in the preceding Example may be readily oxidized to form cupric chloride. It will be readily understood that the two combined Examples take into account the function of the lixiviation-oxidation operation in accordance with the invention as described above.

A litre of a synthetic solution having a 0.5 N hydrochloric acidity and containing 41.0 g/l of copper in the form of cupric chloride and 176 g/l of iron in the form of ferrous chloride was poured into a reaction vessel fitted at its top with a porous plate.

The solution was held at a temperature of 85° C ± 5° C and a stream of air was admitted thereto through the porous plate at a rate of approximately 160 litres per hour.

At the end of an hour it was found that the solution was no longer acid. The cuprous ion concentration of the solution was also measured. It having been verified that no $Cu^+$ ions were present, it could be concluded that it was possible to oxidize, with hydrochloric acid and air, cuprous chloride dissolved in a ferrous chloride solution.

II. Purification and anion change

Referring again to the drawing, it will be seen that the lixiviation solution leaves the reaction vessel 2 through the pipe 8 and is then subjected to a purification treatment at 9. This solution contains copper which is partially or entirely in the cuprous state, depending upon the operational conditions used in the reaction, the solution also containing iron from the chalcopyrite, and other impurities that require to be eliminated.

Also, the treatment at 9 consists in selectively extracting copper in the cupric form by means of a cation-exchanger solvent. This solvent may for example be one of the reagents sold by Messrs. General Mills under the tradename "LIX", or one of the agents marketed by Messrs. Ashland under the name "KELEX".

In order fully to emphasize the inherent originality of this stage of the method in accordance with the invention, it might first of all be recalled that cation-exchanger solvents have, for a given metal, an extraction capacity which increases with the pH-value of the aqueous solution with which they are contacted.

This being the case, the exchange reaction can be written as follows in the case of copper:

wherein $Cu^{++}$ represents the cupric ions contained in the aqueous phase, HR the cation exchanger in the organic phase, $CuR_2$ the organic copper complex obtained in the organic phase, and $H^+$ the acidity released in the aqueous phase.

It will thus be readily appreciated that in the case of a conventional cation exchange, extraction of the metal releases additional acidity in the aqueous phase and this correspondingly decreases the capacity of the solvent. When it is required to maintain the latter at its optimum value, it is necessary to neutralize the acidity that passes into the aqueous phase by means of an alkaline soda or potassium solution for example, the total exchange reaction then being as follows:

As a result, extraction of the cation is generally accompanied by the consumption of acid and base.

In contrast, in the method in accordance with the invention and because of the specific properties of copper in a chloride medium, it is possible to extract the copper in the cupric form by using the maximum capacity of the solvent and at the same time avoiding the consumption of basic reagent which is usually necessary.

After lixiviation, the copper is in fact for the most part in the cuprous state. By contacting the solution with an organic solvent selected from those mentioned above, it becomes possible to extract the copper in the cupric form by the reaction (8). This first cation-exchange results in acidifying the extraction solution and thus in reducing the coefficients of the division of the copper between the aqueous phase and the organic phase. It then suffices to inject air into the solution in accordance with reaction (2) in order to oxidize the cuprous chloride to bring it to the cupric state and to consume the $H^+$ ions produced during extraction. The cupric chloride formed from the cuprous chloride is again under the optimum conditions for permitting its extraction and remains so while there is still cuprous chloride in the solution.

It will thus be appreciated that the extraction stage which is indicated as a whole by the numeral 9 in the drawing in fact comprises two operations namely 9a which is the extraction operation proper, and 9b which is the oxidation of the aqueous phase by means of air injected into the solution through a pipe 10.

Two practical methods of carrying out this set of operations will now be described.

In the first, extraction is carried out in the conventional manner in a single mixing and decanting apparatus, and air is injected directly into its mixing compartment. Oxidation takes place in situ in this case, and acid is consumed continuously.

In the second method, use is made of two mixing and decanting apparatuses, and the aqueous phase, upon leaving the first apparatus, passes through an oxidation reaction vessel before entering the second apparatus. The oxidation reaction vessel is fitted with stirring means and a device for drawing air into it, so that oxidation of the solution in this case takes place outside the mixing and decanting apparatuses.

Thus, to carry out extraction of copper by means of a solvent in accordance with the method of the invention, one or two stages using mixing and decanting apparatus are sufficient. It should be pointed out also that, in accordance with the theory here used, it is possible to extract only half of the copper present in the solution if it is required to keep the solvent at its maximum capacity, since, for each $Cu^{++}$ cation extracted, two $H^+$ ions are released in the aqueous phase. It will be readily understood that if it is required to extract more than half of the copper present, it will suffice to increase the ratio of the volume of the organic phase to that of the aqueous phase, and/or the number of extraction stages. However, such a step is generally not of help, since the aqueous solution still containing cupric ions can be recycled to the lixiviation stage where the cupric chloride is again reduced by the initial sulphurized concentrate.

As regards the temperature at which extraction is carried out, this should be at least equal to the ambient temperature but is preferably between 30° and 60° C. The pH-value of the solution can be kept at a value in the order of magnitude of 1 because of the oxidation of the cuprous chloride by air. The method of the invention can nevertheless be applied to solutions having a pH-value of less than 1, though then conditions slightly below the best exist.

As regards the ratio of the volume of the organic phase to that of the aqueous phase, it is obvious that this should be fixed in dependence upon the operational conditions, and particularly in dependence upon the copper concentration in the extraction solution. By way of example this ratio may be between 0.5 and 5, the charged solvent containing 2 to 10 g/l of cupric ions.

If it is required to carry out complete purification of the solvent charged with cupric ions, it is expedient to wash it with water or cupric sulphate using techniques that are very well known to specialists in the field, so as to eliminate in particular traces of chloride ions as well as other metallic impurities which could have been entrained during extraction.

Returning to the drawing, it will be seen that the organic phase 11, resulting from the extraction-oxidation stage 9 that has just been described, is then subjected to an operation 12 for the re-extraction of the copper by means of a sulphuric acid solution 13. The aqueous phase rejoins the lixiviation stage through the pipe 5a as has been stated above.

The reaction 12 takes place in accordance with the following equation:

$$CuR_2 + H_2SO_4 \rightleftharpoons 2 HR + CuSO_4 \quad (10)$$

wherein $CuR_2$ is the organic phase 11, and HR is the organic regeneration solvent. This latter can be used again for extracting the copper.

This re-extraction is carried out on a counterflow basis in mixing and decanting apparatuses, the number of which will depend upon the objectives that it is desired to achieve, and particularly upon the required final concentration of cupric sulphate, as well as upon the residual copper content that is permitted in the solvent.

It will be understood that this operation causes the cupric ions, which are present in the organic phase 11, to pass into the aqueous re-extraction phase, and that there is finally obtained an aqueous cupric sulphate solution 14 containing for example 20 to 100 g/l of copper. The regenerated organic phase 15 is obviously used for extracting further quantities of copper at 9. To do this, it is introduced at 16 into the mixing stage of the first mixing and decanting apparatus used for extraction.

The aqueous cupric sulphate solution 14 is then subjected to electrolysis at 17, and this constitutes the next step in the process.

EXAMPLE V

The present Example is designed to test the capacity and selectivity of an organic solvent called "LIX 65 N" in the extraction of copper in cupric chloride and ferrous chloride solutions.

More particularly, the object of this test was to measure the capacity and selectivity of LIX 65 N diluted to 30% in ESCAID 100, a solvent used for extracting copper, in the case of solutions containing CuCl, $CuCl_2$ and $FeCl_2$, the latter being the agent for the dissolution of the copper.

To simplify matters, use was made of solutions containing only ferrous chloride and cupric chloride, and neutralization was carried out with soda. Thus, the capacity of the solvent was ascertained and its selectivity as regards iron was determined as a function of acidity in the state of equilibrium.

The results shown in Table IV below were obtained:

TABLE IV

| Type of solution | Acidity in the state of equilibrium | Aqueous phase | | Organic phase | | |
|---|---|---|---|---|---|---|
| | | $Fe^{++}$ g/l | $Cu^{++}$ g/l | Fe g/l | Cu g/l | Cu/Fe |
| | 0.086 | 100 | 54.1 | 0.048 | 5.9 | 123 |
| | 0.073 | " | 53.7 | 0.034 | 6.3 | 185 |
| Fe=100g/l | 0.060 | " | 54.6 | 0.037 | 6.7 | 181 |
| Cu=60g/l | 0.050 | " | 52.9 | 0.042 | 7.1 | 169 |
| | 0.036 | " | 58.3 | 0.050 | 7.8 | 156 |

It was thus found that it was possible to extract selectively, by liquid-liquid exchange, the copper contained in a solution of the above specified type.

III. Electrolysis

This operation can be readily carried out by means of techniques which are used on an industrial basis in copper hydrometallurgy, and it will not be described in detail herein.

It suffices to state that copper having what is known as "electrolytic" purity is obtained at the cathode, and that sulphuric acid, which can be used again for the re-extraction operation 14, is obtained at the anode.

IV. Elimination of impurities and production of hydrochloric acid.

The aqueous solution resulting from the extraction of copper at 9 mainly contains cupric chloride and ferrous chloride as well as various metallic impurities not capable of extraction by the solvent in the operational conditions used. As stated previously, the major part of this solution is recycled to the lixiviation stage through the pipe 5a (see drawing). The rest of the solution 18 consists of the flushed-out impurities and it is first subjected to treatment at 19 whereby copper is completely removed. This latter treatment can be carried out either by a cementation procedure or by extraction by means of a cationic solvent or by extraction on resins or by means of an anionic solvent, exploiting the readiness with which cupric copper is complexed in a chloride medium in the $CuCl_4^{--}$ form.

The solution from which copper is completely removed in this way is then subjected at 20 to an operation in which silver and other metallic impurities that is contains are recuperated, this operation comprising for example cementation by means of metallic powder, e.g. iron powder.

The flushed-out solution which is then free of valuable elements mainly contains ferrous chloride which can be readily subjected to pyrohydrolysis at 21, and this produces on the one hand iron oxide at 22 and on the other hand hydrochloric acid at 23 which is recycled through the pipe 7 to the lixiviation stage. The operating conditions for this pyrohydrolysis treatment are well known in industry and there is no need to describe them here.

Finally, referring again to the lixiviation stage, it should be pointed out that it could be carried out in a single reaction vessel.

We claim:

1. A method for obtaining electrolytic copper and other useful metals from sulphurized concentrates, comprising, in combination, the following stages:
    a. lixiviating said sulphurized concentrate with an aqueous solution containing cupric chloride formed in situ, at least in part, by oxidation, by introducing hydrochloric acid and air into the cuprous chloride solution resulting from lixiviation;
    b. partially extracting the copper contained in the lixiviation solution resulting from stage a), by contacting said lixiviation solution with an organic extractant containing a cationic solution, said extraction being accompanied by oxidation by injecting air into said lixiviation solution;

c. re-extracting the copper contained in said organic extractant by contacting said organic extractant with an aqueous solution of sulphuric acid and recycling the organic extractant to the extraction stage b); and
d. electrolyzing the copper sulphate obtained in stage c), to yield copper and an aqueous solution of sulphuric acid which is recycled to the re-extraction stage (c), at least part of the aqueous solution, which results from the partial copper extraction stage (b), being recycled to the lixiviation stage (a) and constituting a part of said cupric chloride solution, the other part of said aqueous solution being treated to recover the useful metals and the hydrochloric acid that it contains.

2. A method according to claim 1, in which the temperature of said lixiviation solution is higher than 50° C and its pH-value is at most 1.

3. A method according to claim 2, in which the temperature of said lixiviation solution is between 90° and 105° C and its pH-value is between 0 and 1.

4. A method according to claim 1, in which said aqueous cupric chloride solution also contains an agent for solubilizing cuprous chloride selected from the group consisting of alkaline chlorides, alkaline-earth chlorides, ammonium chloride and ferrous chloride.

5. A method according to claim 4, in which said solubilizing agent is sodium chloride used in an amount of between 100 and 300 g/l.

6. A method according to claim 1, in which the part of the aqueous phase resulting from the extraction stage b) that is not recycled to the lixiviation stage a) is treated to recover, at least partially, the metals that it contains, with the exception of iron, and is then subjected to pyrohydrolysis to produce iron oxide and hydrochloric acid, the latter being recycled to the lixiviation stage a).

7. A method according to claim 1, in which said aqueous lixiviation solution also contains at least 50 grammes of iron per liter.

8. A method according to claim 1, in which said aqueous lixiviation solution has an oxido-reduction potential of between 500 and 800 millivolts.

9. A method according to claim 1, in which said lixiviation solution contains 10 to 50 grammes of copper per liter.

10. A method according to claim 1, in which said lixiviation stage a) is carried out in a reaction vessel which comprises in combination, two compartments interconnected at their bottom by a passage, a stirring means in each compartment, a decanter, an overflow at the top of the first of said compartments, which overflow runs into said decanter, and pipes connecting the upper part of the second of said compartments to the decanter and to means for extracting the aqueous solution after lixiviation, said decanter being provided at its base with a means for evacuating the solid products, the first of said compartments having at its lower part a pipe for delivering said cuprous chloride solution and the second of said compartments having air-injection pipes and pipes for introducing hydrochloric acid.

11. A method according to claim 1, in which said extraction stage b) is achieved by means of at least one mixing and decanting apparatus, and said air injection takes place in said mixing compartment.

12. A method according to claim 1, in which said extraction stage (b) is achieved by means of at least a pair of mixing and decanting apparatuses, and said air injection takes place in an exterior oxidation reaction vessel through which passes the aqueous solution which flows from one to the other of said pair of mixing and decanting apparatuses.

13. A method according to claim 1, in which said stage b) for the partial extraction of the copper is carried out at a temperature of between 30° and 60° C.

14. A method according to claim 1, in which said stage b) for the partial extraction of the copper is carried out at a pH-value of between about 0 and 1, the ratio of the volume of the organic phase to that of the aqueous phase being between about 0.5 and 5.

15. A method according to claim 1, in which said organic extrantant containing a cationic solvent is washed with water following the re-extraction stage (c) and prior to recycling to the extraction stage (b).

16. A method according to claim 1, in which said copper sulphate solution contains 20 to 100 grammes of copper per liter at the electrolysis stage (d).

* * * * *